US007495700B2

(12) United States Patent
Watanabe

(10) Patent No.: US 7,495,700 B2
(45) Date of Patent: Feb. 24, 2009

(54) MOVING IMAGE CAPTURE DEVICE, MOVING IMAGE CAPTURE CONTROL METHOD, AND MOVING IMAGE CAPTURE CONTROL PROGRAM

(75) Inventor: Akira Watanabe, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 665 days.

(21) Appl. No.: 11/095,876

(22) Filed: Mar. 31, 2005

(65) Prior Publication Data

US 2005/0219372 A1 Oct. 6, 2005

(30) Foreign Application Priority Data

Apr. 5, 2004 (JP) ............... 2004-111057

(51) Int. Cl.
*H04N 5/262* (2006.01)
*H04N 5/225* (2006.01)

(52) U.S. Cl. ............... 348/239; 348/373; 348/376; 348/552; 455/575.3

(58) Field of Classification Search .............. 348/239, 348/333.06, 333.12
See application file for complete search history.

(56) References Cited

U.S. PATENT DOCUMENTS

| | | | | |
|---|---|---|---|---|
| 5,175,622 A | * | 12/1992 | Inoue et al. | ................. 348/584 |
| 5,359,712 A | * | 10/1994 | Cohen et al. | ................. 715/723 |
| 6,104,808 A | | 8/2000 | Alameh et al. | |
| 6,700,621 B1 | | 3/2004 | Seo | |
| 7,145,593 B2 | * | 12/2006 | Yamaguchi et al. | ...... 348/14.02 |
| 2003/0179314 A1 | * | 9/2003 | Nozaki | ...................... 348/375 |
| 2004/0092247 A1 | * | 5/2004 | Tani | .......................... 455/410 |
| 2004/0204064 A1 | * | 10/2004 | Ikeda et al. | .............. 455/556.1 |

FOREIGN PATENT DOCUMENTS

JP 11-098411 A 4/1999

* cited by examiner

*Primary Examiner*—Ngoc-Yen T Vu
*Assistant Examiner*—Paul Berardesca
(74) *Attorney, Agent, or Firm*—Frishauf, Holtz, Goodman & Chick, P.C.

(57) ABSTRACT

A cellular phone set comprises a control device, a display device, a speaker, a microphone, a camera, a storage device, a power supply section, a communication device, an opened and closed state detector, and an acceleration sensor for detecting a state in which a second case has been started to be opened with respect to a first case, a state in which the second case has been started to be superimposed (closed) with respect to the first case, or an acceleration in a state in which the second case is completely superimposed (closed).

10 Claims, 16 Drawing Sheets

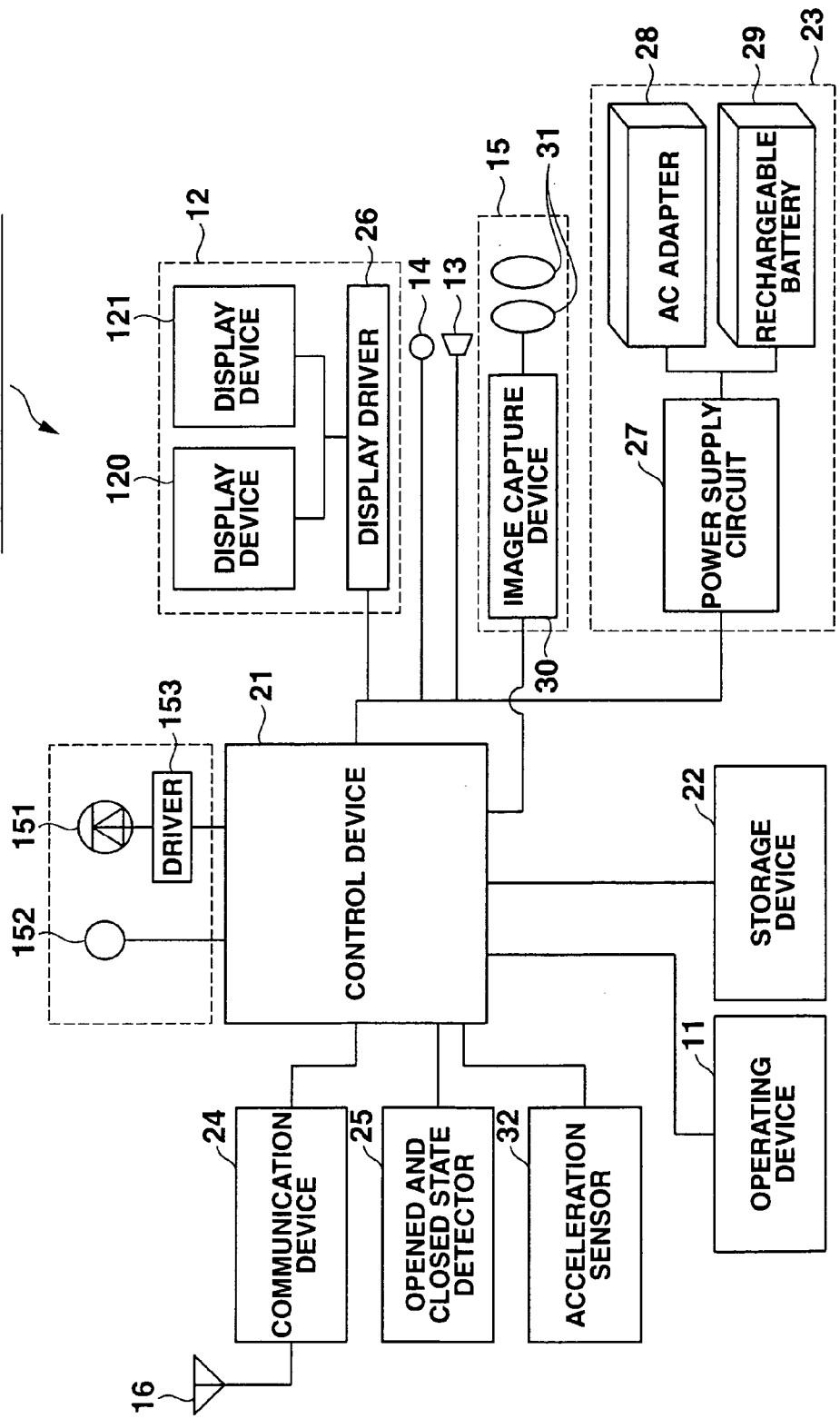

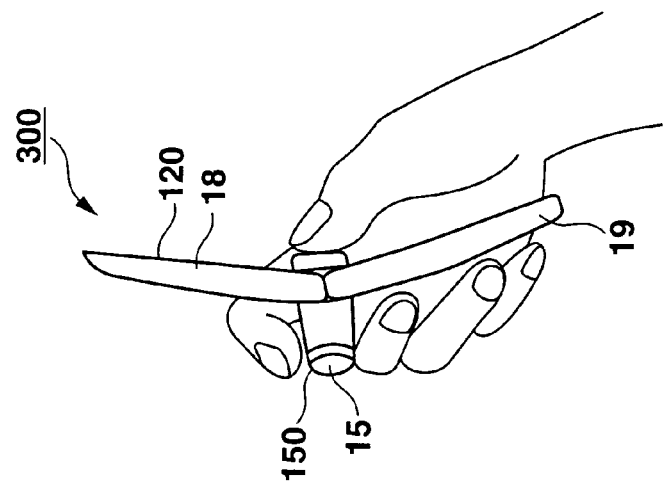
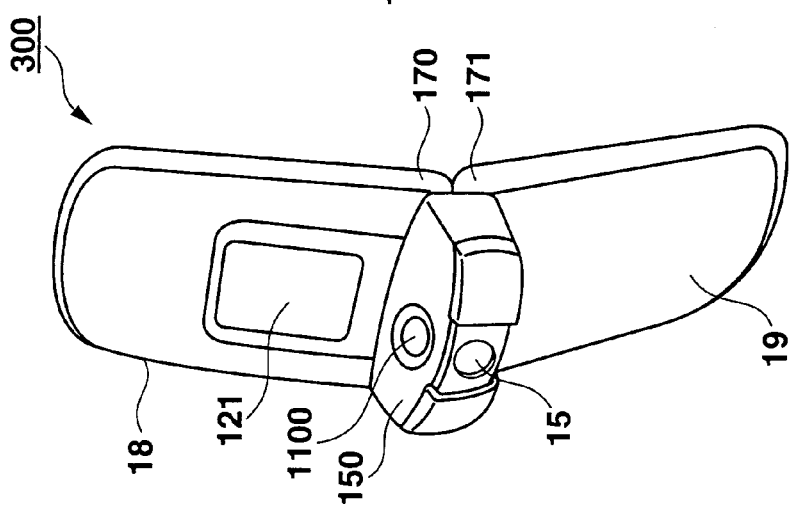
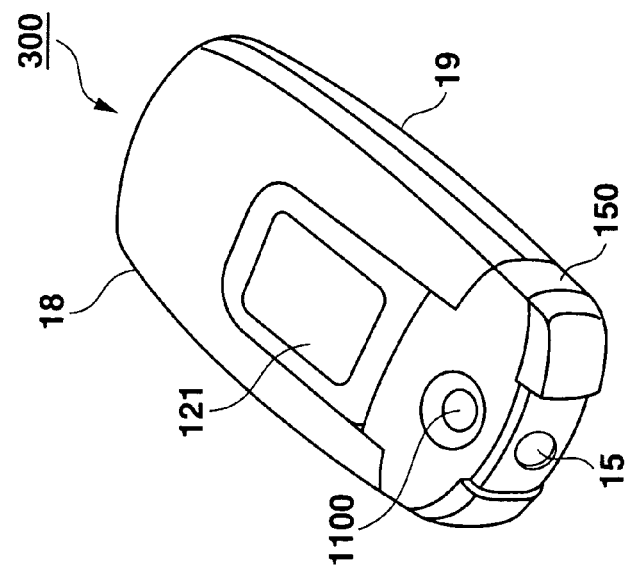

MOVING IMAGE CAPTURE DEVICE, MOVING IMAGE CAPTURE CONTROL METHOD, AND MOVING IMAGE CAPTURE CONTROL PROGRAM

CROSS-REFERENCE TO RELATED APPLICATIONS

This application is based upon and claims the benefit of priority from prior Japanese Patent Application No. 2004-111057, filed Apr. 5, 2004, the entire contents of which are incorporated herein by reference.

BACKGROUND OF THE INVENTION

1. Field of the Invention

The present invention relates to a moving image capture apparatus, a moving image capture control method, and a moving image capture control program, which are represented by, for example, a cellular phone set with a camera comprising two housings.

2. Description of the Related Art

In recent years, there has been well known that a multifunctional cellular phone set comprising a camera function comprises a moving image capture function as well as a still image capture function.

In addition, in recent years, as a technique for editing a moving image file, there has been known a technique for providing performance effects such as a fade-in/fade-out or wipe-in/wipe-out in each frame at the start and end frames of the moving image file. These performance effects are provided to the moving image acquired in the moving image capture device such as a digital movie camera by using a video editing device or video editing software.

In addition, as disclosed in Japanese Patent Application (KOKAI) Publication No. 11-98411, a capture device comprises a fader function capable of the above-described moving image editing.

However, there has been a problem that, in the case where a user carries out moving image capture in a multifunctional cellular phone set comprising a camera function, operation is complicated.

Further, there has been very complicated to a general user to transfer a moving image file acquired by the moving image capture device to a video image editing device as described above and to edit the transferred file again.

Moreover, in the case where the moving image capture device comprises a fader function for carrying out editing, such editing must be carried out by a predetermined button operation or the like. Such button operation is very complicated to the user, and there has been a danger that operational simplicity is degraded.

BRIEF SUMMARY OF THE INVENTION

It is an object of the present invention to provide a moving image capture apparatus, a moving image capture control method, and a moving image capture control program capable of easily starting or ending moving image capture or executing a fader function.

According to an embodiment of the present invention, a moving image capture apparatus comprises an image pickup device, a moving image capture device which captures a moving image by driving the image pickup device, a first case, a second case, a connecting portion which connects the first case and the second case to each other, a first detection device which detects a change in positional relationship between the first case and the second case, and a capture control device which controls one of start and end of moving image capture by the moving image capture device in response to detection by the first detection device.

According to another embodiment of the present invention, a moving image capture control method of a moving image capture apparatus having a first case, a second case, and a connecting portion which connects the first case and the second case to each other, the method comprises a moving image capture step of acquiring a moving image by driving an image capture section, a first detection step of detecting a change in positional relationship between the first case and the second case, and a capture control step of controlling a start or an end of moving image capture by the moving image capture step in response to detection by the first detection step.

According to still another embodiment of the present invention, a moving image capture control program executed by a computer included in a moving image capture apparatus having a first case, a second case, and a connecting portion which connects the first case and the second case to each other, the program causes the computer to execute: a moving image capture step of acquiring a moving image by driving an image capture section; a first detection step of detecting a change in positional relationship between the first case and the second case; and a capture control step of controlling a start or an end of moving image capture by the moving image capture step in response to detection by the first detection step.

According to a further embodiment of the present invention, a moving image capture apparatus comprises image pickup means, moving image capture means for acquiring a moving image by driving the image pickup means, a first case, a second case, a connecting portion for connecting the first case and the second case to each other, first detection means for detecting a change in positional relationship between the first case and the second case, and capture control means for controlling one of start and end of moving image capture by the moving image capture means in response to detection by the first detection means.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 2 is a block diagram depicting an internal configuration of each of cellular phone sets 1, 100, 200, 300, 400, and 500 in the present embodiment;

FIG. 9A is a perspective view showing a closed state of a cellular phone set 300 according to a fourth embodiment of the invention;

FIG. 9B is a perspective view showing an opened state of the cellular phone set 300;

FIG. 9C is a aide view showing a case in which a user holds the cellular phone set 300 in the opened state;

DETAILED DESCRIPTION OF THE INVENTION

An embodiment of a moving image capture apparatus, a moving image capture control method, and a moving image capture control program according to the present invention will now be described with reference to the accompanying drawings.

First Embodiment

Hereinafter, a cellular phone set 1 according to a first embodiment of the present invention will be described with reference to the accompanying drawings. However, the scope of the invention is not limited to the illustrative embodiments.

Figure 1A:
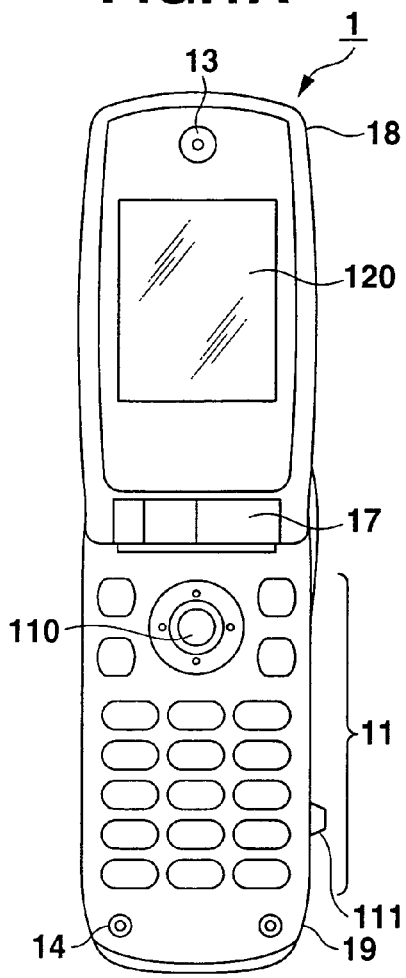
FIG. 1A is a front view of an opened state of a cellular phone set 1 according to a first embodiment of the present invention.

FIG. 1A is a view showing a folding portable cellular phone with a camera, the view showing a frontal appearance of the portable cellular phone 1 in a completely opened state. As shown in FIG. 1A, the portable cellular phone 1 is configured such that a first case 18 and a second case 19 are bonded with each other by a hinge 17 so as to ensure that the first case 18 and the second case 19 are faced each other around the hinge 17.

The first case 18 comprises a display device 12 (a main display device 120 and a subsidiary display device 121) which is a liquid crystal display for displaying information to a user by means of images; and a speaker 13 for outputting a sound. The second case 19 comprises a center key 110 for accepting the user's operating instruction and detecting the user determined instruction operation; an operating device 11 including a side switch 111; and a microphone 14 for inputting a voice. A switch (not shown) for sensing a completely opened state is provided inside of the hinge 17.

Figure 1B:
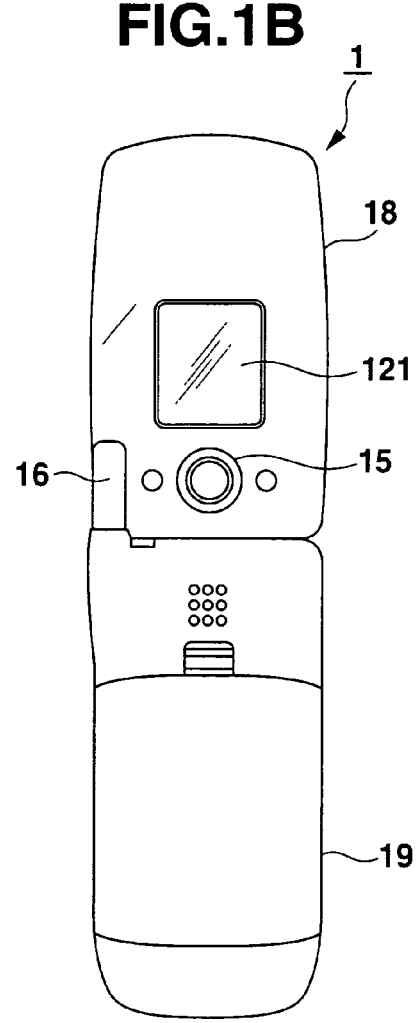
FIG. 1B is a rear view of the cellular phone set 1.

FIG. 1B is a view showing a rear appearance of the cellular phone set 1 in a completely opened state. As shown in FIG. 1B, the first case 18 comprises the subsidiary display device 121 which is a liquid crystal display for displaying information to a user by means of images even when it is closed; and a camera 15 for acquiring a still image or a moving image of an object. The second case 19 comprises an antenna 16.

Figure 1C:
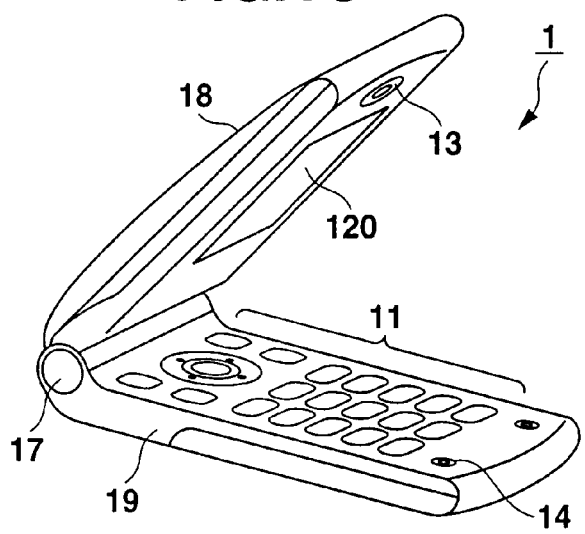
FIG. 1C is a perspective side view of the portable cellular phone 1.

FIG. 1C is a view showing a state in which the closed state of the portable cellular phone 1 is being changed to an opened state or vice versa. The cellular phone set 1 comprises a mechanism for locking the cellular phone set in a completely opened state or a closed state by a spring or the like inside of the hinge 17 (not shown). The user holds the first case 18 and the second case 19, and applies a predetermined force, thereby releasing a lock and opening and closing the cellular phone set through the state shown in FIG. 1C.

Figure 1D:
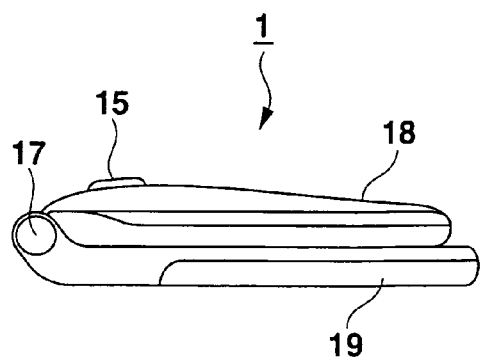
FIG. 1D is a side view of the cellular phone set 1 in a closed state.

FIG. 1D is a view showing a side appearance of the cellular phone set 1 in a completely closed state. The cellular phone set 1 comprises a switch for sensing a completely closed state inside of the hinge 17. For example, power supply of a predetermined portion is turned OFF by closing the cellular phone set.

Now, an internal configuration of the cellular phone set 1 will be described with reference to FIG. 2.

As shown in FIG. 2, the portable cellular phone 1 comprises a control device 21, a storage device 22, a power supply section 23, a communication device 24, an opened and closed state detector 25, a display driver 26, a power supply circuit 27, the operating device 11, the speaker 13, the microphone 14, an acceleration sensor 32, and the camera 15. These sections are electrically connected to each other.

The control device 21 comprises a central processing unit (CPU) (not shown), an internal random access memory (RAM), and a read only memory (ROM). The CPU sends a control signal to each section described above and controls a whole operation of the portable cellular phone 1 in accordance with a variety of control programs stored in the ROM while a predetermined region of the internal RAM is used as a work region.

The display device 12 comprises the display driver 26, the main display device 120, and the subsidiary display device 121. An image signal input from the control device 21 is converted by of the display driver 26, the converted image signal is output as an image output signal to the main display device 120 or the subsidiary display device 121, and an image is displayed.

The speaker 13 outputs a sound based on sound output data input from the control device 21. The microphone 14 converts the voice into a sound analog signal and outputs the converted analog signal to the operating device 11.

The camera 15 comprises a lens 31, an image capture device 30 and the like. The camera outputs an image signal to the control device 21 in accordance with an instruction of the control device 21, the image signal being obtained by an image optically incident from the lens 31 and formed on the image capture device 30.

The storage device 22 comprises a RAM which is a nonvolatile memory, a magnetic or optical recording medium, and its related drive device, a nonvolatile memory and the like (not shown). For example, the storage device stores programs associated with system or operation of the portable cellular phone 1 such as an operating system (OS) or a variety of operating programs, and a variety of data such as moving image or sound.

The power supply section 23 includes the power supply circuit 27, an AC adapter 28 connected to the power supply circuit, a rechargeable battery 29 and the like. The power supply section converts power supply supplied from the AC adapter 28 or rechargeable battery 29 to the power supply circuit 27 to a predetermined voltage and supplies the converted voltage to each section in accordance with an instruction for power control from the control device 21.

The communication device 24 includes a radio section for transmitting and receiving a radio signal and a communication processing device for carrying out decoding of the radio signal and conversion into the radio signal (not shown). The communication device carries out voice communication with another terminal or data transmission and receiving by means of radio communication with communication personnel in accordance with standards or communication protocols of a variety of portable cellular phones or radio modems.

The opened and closed state detector 25 detects an opened state or a closed state by a switch provided inside of the hinge 17 and outputs a predetermined signal to the control device 21. The switch may be a switch for detecting an angle, for example, and may be a constituent element for converting the detected angle into a predetermined signal and outputting the converted signal to the control device 21.

The control device 21 also calculates time in the opened or closed state or the state shift time.

The acceleration sensor 32 comprises an electro-static capacity type or piezoelectric type acceleration sensor. The sensor detects an acceleration in a state in which the second case 19 is started to be opened relevant to the first case 18, or a completely opened state is established, and conversely, the second case 19 is started to be superimposed (closed) relevant to the first case 18, or a completely superimposed (closed) state is established, and outputs the detected acceleration to the control device 21.

In addition, although enclosed in a broken line in the figure, an LED 151 emits light when a moving image is acquired in a dark place, and a driver 153 is provided as a circuit for controlling the LED 151 to be driven by the control device 21. The LED 151 and driver 153 are embodied in a second embodiment, a fourth embodiment, and a fifth embodiment of the invention. A sound collecting microphone 152 is provided to record sound information in a direction of an object during moving image capture, and is embodied in the forth embodiment.

Figure 3:
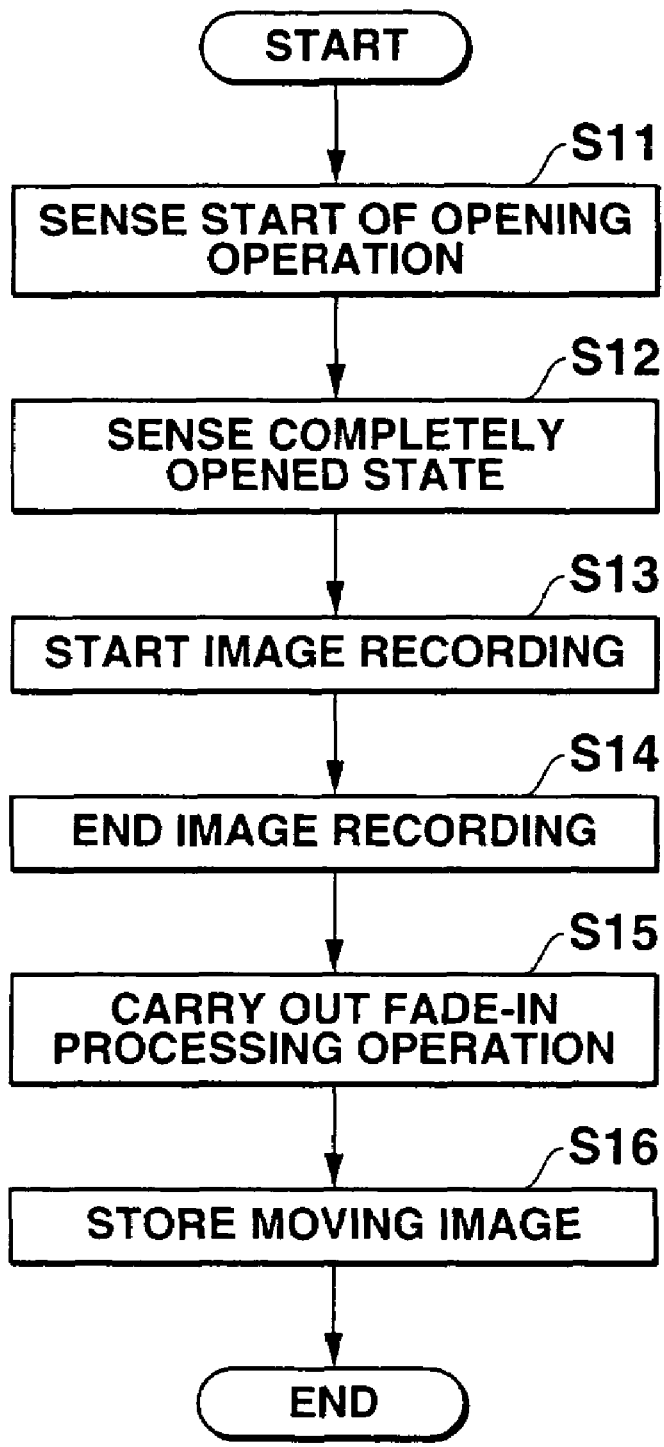
FIG. 3 is a flow chart illustrating a fade-in processing operation in a first embodiment of the invention.

Now, a fade-in processing operation in the cellular phone set 1 will be described with reference to a flow chart shown in FIG. 3. The processing operation described here includes step S11 to step S16 to be carried out by the control device 21 of the cellular phone set 1.

The portable cellular phone 1 in a closed state detects a start of opening operation at step S11 (serving as position state transition detecting means); detects a completely opened state at step S12 (serving as control means); and starts capture of moving image at step S13.

The start of capture at step S13 may be a restart of a temporarily interrupted moving image capture. When the moving image capture is started, a file processing for creating an image file from captured moving image data is started.

Step S11 may be a step of detecting a predetermined acceleration state A and step S12 may be a step of detecting a predetermined acceleration state B. Upon detecting the predetermined acceleration state A and the predetermined acceleration state B, step S13 may be started.

In the case where the above acceleration states are detected, there is no need for detecting a transition of an opened or closed state of two housings. Thus, the present invention is not limited to the folding type layout of the cellular phone set 1 shown in the present embodiment.

In step S12, it may be possible to detect a time from the start of an opening operation to a completely opened state or detect a change history of an angle of the hinge 17, and then, record the detected time and the detected change history as an opening operation history.

After step S13, image capture (file processing) is terminated in accordance with a predetermined instruction at step S14. Then, at step S15 (serving as processing means), a fade-in processing operation is applied to the acquired moving image. The above moving image is stored at step S16 (serving as recording means), and processing terminates.

The fade-in processing at step S15 may adjust a degree of processing such as adjusting a fade-in time to be long according to the above opening operation history, for example, according to the detected time; or alternatively, adjusting a degree of brightness in fade-in according to the detected angle.

In the present embodiment, although fade-in processing has been shown, wipe-in processing may be carried out or no processing may be carried out without being limited thereto in particular.

Figure 4:
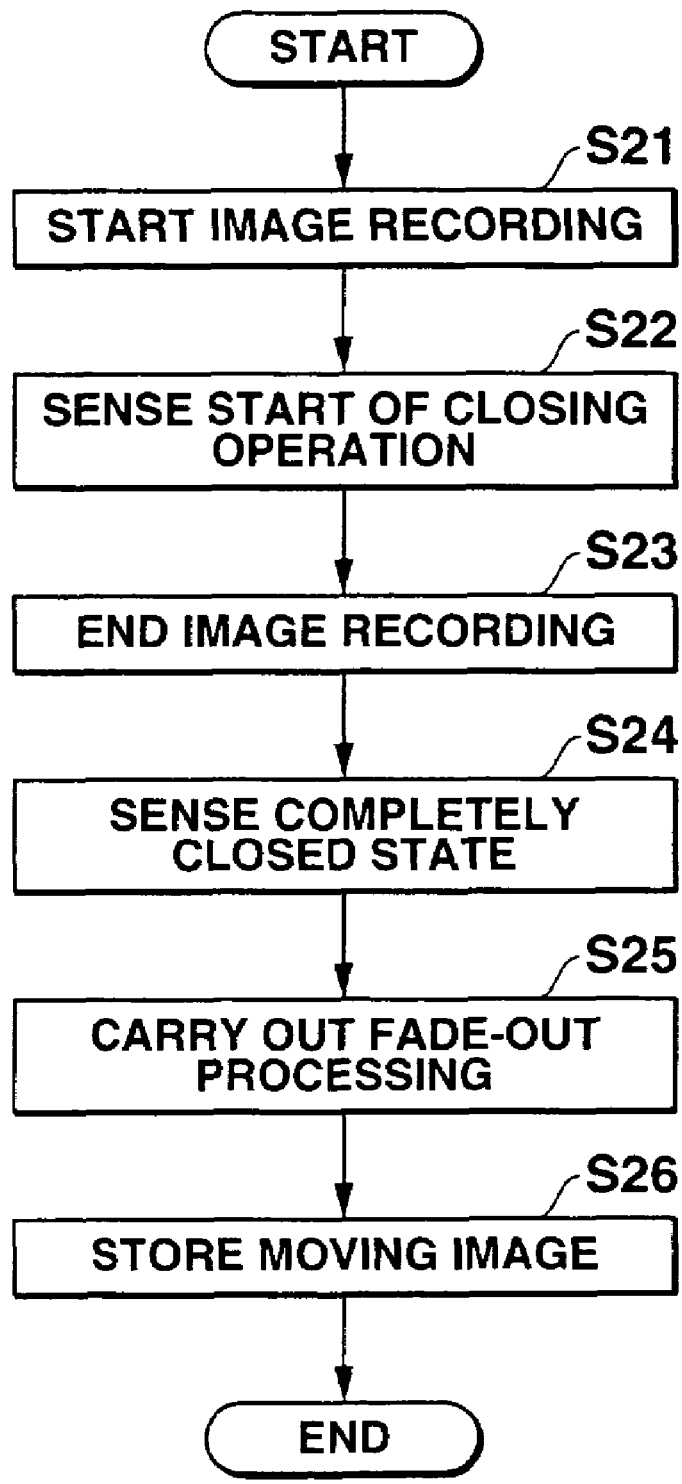
FIG. 4 is a flow chart illustrating a fade-out processing operation in the first embodiment.

Now, a fade-out processing operation in the cellular phone set 1 will be described with reference to a flow chart shown in FIG. 4. The processing operation described here includes step S21 to step S26 to be carried out by the control device 21 of the cellular phone set 1.

The cellular phone set 1 starts capture of a moving image in accordance with a predetermined instruction in a state in which the cellular phone set 1 is opened at step S21. The predetermined instruction described here may be an instruction described in the above fade-in processing operation as shown in steps S11 and S12.

After step S21, a closing operation is detected at step S22, whereby acquired image recording is terminated at step S23, a completely closed state is detected at step S24, and a fade-out processing operation of the acquired moving image is carried out at step S25.

Step S22 may be a step of detecting a predetermined acceleration state A and step S24 may be a step of detecting a predetermined acceleration state B. Upon detecting the predetermined acceleration state A, step S23 may be started.

In step S24, it may be possible to detect a time from the start of a closing operation to a completely closed state or detect a change history of an angle of the hinge 17, and then, record the detected time and the detected change history as a closing operation history.

The fade-out processing at step S25 may adjust a degree of processing such as adjusting a fade-out time to be long according to the above closing operation history, for example, according to the detected time; or alternatively, adjusting a degree of brightness in fade-out according to the detected angle.

In the present embodiment, although fade-out processing has been shown, wipe-out processing may be carried out or no processing may be carried out without being limited thereto in particular.

After step S25, at step S26 (serving as processing means), the above-described fade-out processed moving image is stored, and the processing operation terminates.

As has been described above, the cellular phone set 1 can start image capture by opening it from a closed state and can terminate image capture by closing it from an opened state.

The cellular phone set 1 can also detect acceleration of a housing by the acceleration sensor, thereby making it possible to start or terminate image capture.

Further, the cellular phone set 1 is capable of carrying out moving image editing such as fade-in/fade-out or wipe-in/wipe-out processing operation according to an opening or closing operation.

Other embodiments of the moving picture capture apparatus according to the present invention will be described. The same portions as those of the first embodiment will be indicated in the same reference numerals and their detailed description will be omitted.

Second Embodiment

Now, a cellular phone set 100 according to a second embodiment of the invention will be described here.

In FIGS. 5A, 5B, 6A and 6B showing a slide type portable cellular phone to which the present invention has been applied, the cellular phone set 100 comprises the second case 19, a first case 180, a third case 181, and first and second hinges 170 and 171 for connecting these elements to each other.

Figure 5A:
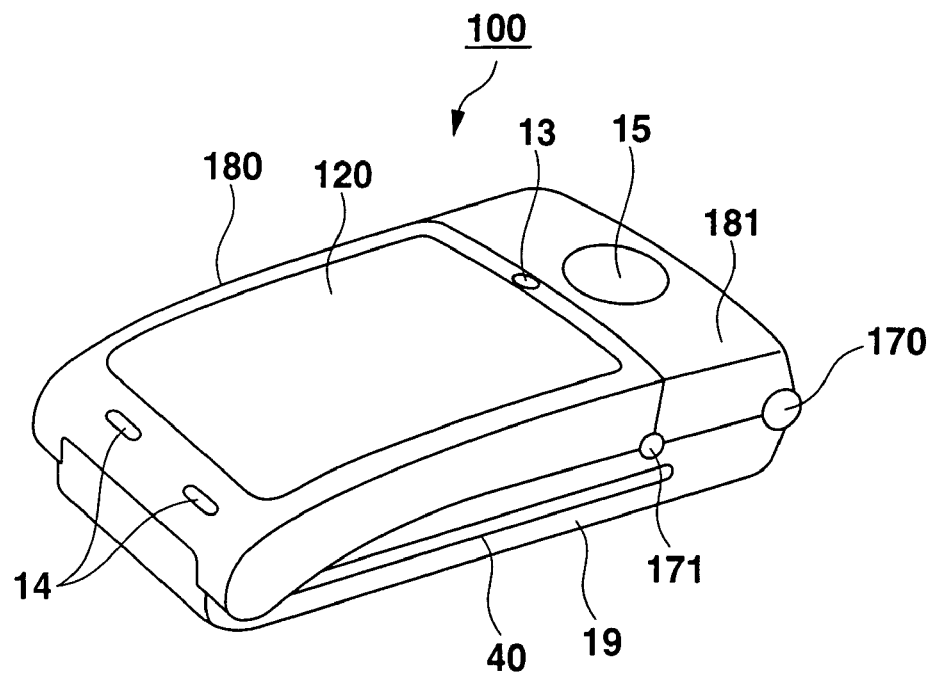
FIG. 5A is a perspective view showing a closed state of a portable cellular phone terminal 100 according to a second embodiment of the invention.
Figure 5B:
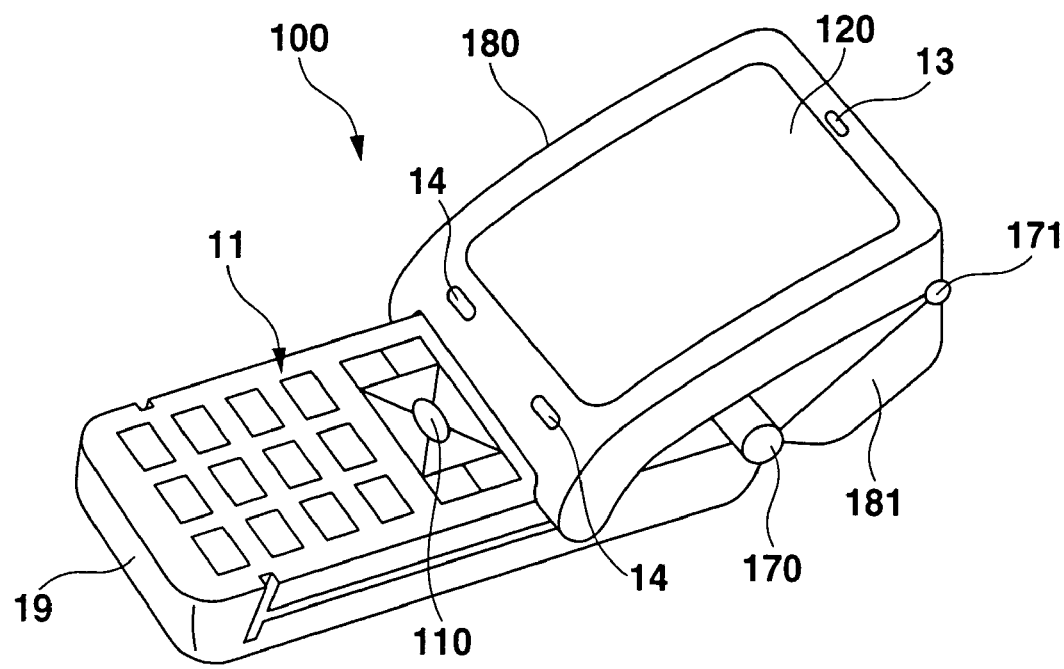
FIG. 5B is a perspective view showing a slid and opened state of the cellular phone set.

The second case 19, as shown in FIG. 5B, comprises the operating device 11 for accepting a user's operating instruction at one face side (top face shown in the figure) thereof.

Figure 6A:
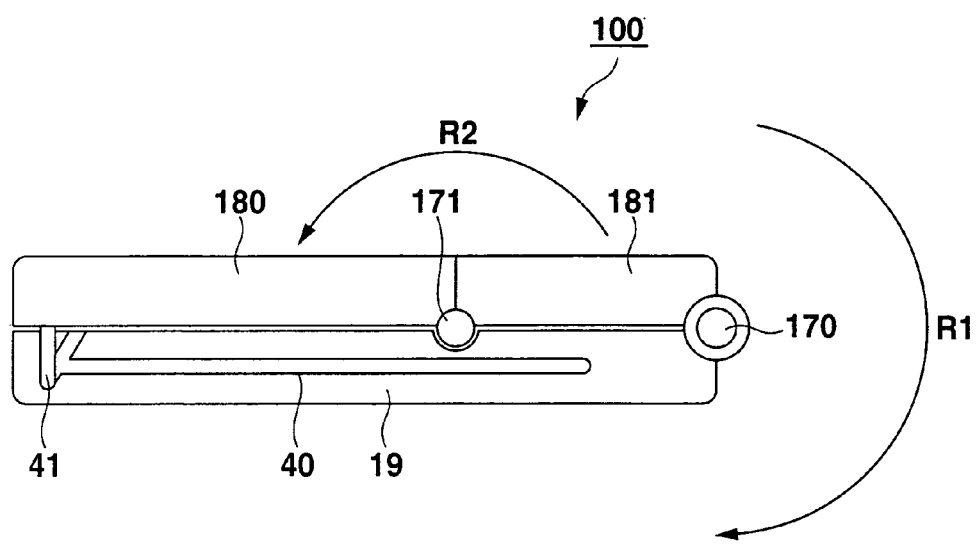
FIG. 6A is a side view showing a closed state of the cellular phone set 100 according to the second embodiment.
Figure 6B:
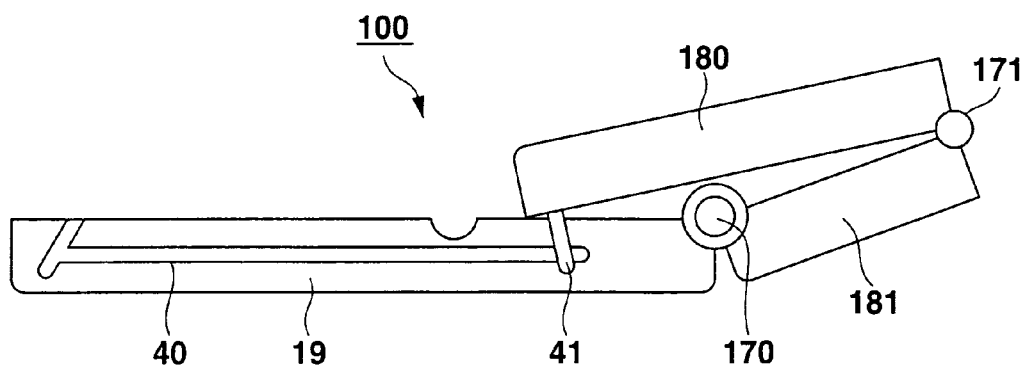
FIG. 6B is a side view showing a slid and opened state of the cellular phone set.

As shown in FIGS. 5A and 6A, the first case 180 and the third case 181 are superimposed along a longitudinal direction on a face having the operating device 11 of the second case 19.

The first case 180 is of size covering one end side from the operating device 11 of the second case 19. As shown in FIG. 5A, the first case comprises the main display device 120 on a surface (a top face shown in the figure) thereof in a state in which the first case is positioned on the second case 19.

The third case 181 is of size covering one end side from the operating device 11 of the second case 19. As shown in FIG. 5A, the third case comprises the camera 15 on a surface thereof in a state in which the third case is superimposed on the second case 19. One end of the third case 181 is turnably coupled to an opposite end to the operating device 11 of the second case 19 by the first hinge 170, and the other end thereof is turnably coupled to one end of the first case 180 by the second hinge 171.

Then, a slide guide groove 40 and a slide guide pin 41 are provided at both sides of the second case 19 and the first case 180. The slide guide groove 40 and slide guide pin 41 are adopted to be slidably coupled with the third case 181 each other at an opposite end thereof. The slide guide 41 is inserted into the slide guide groove 40 to be slidably engaged with each other.

The cellular phone set 100 has a closed state as shown in FIGS. 5A and 6A and a state in which it is turned in R1 and R2 directions and is slidably engaged to be opened. Each of the states is detected by the Opened or closed state detector 25 provided inside of the first hinge 170 and the second hinge 171.

As described above, the cellular phone set 100 of the second embodiment is turned or slid, thereby making it possible to detect the start or end of moving image capture. Thus, by starting up an edit mode after moving image capture, processing operation is automatically carried out even if the user does not carry out special processing operations such as fade-in and fade-out processing operations.

Third Embodiment

A cellular phone set 200 according to a third embodiment of the invention will now be described here.

In the cellular phone set 200 according to the third embodiment, as shown in FIGS. 7A to 7D and 8A to 8D, the camera 15 is included in a camera unit 150 which is turnably installed at a first hinge 170 at the side of the first case 18, the camera unit extending to be bent from the first hinge 170 and being turnably installed at a second hinge 171 in the second case 19. The LED (light emitting diode) 151 for emitting light during moving image capture in a dark place is provided adjacent to the camera 15.

Then, a cutout section 1800 capable of storing and passing through an upper half section 1500 of the camera unit 150 is formed in the first case 18.

Figure 7A:
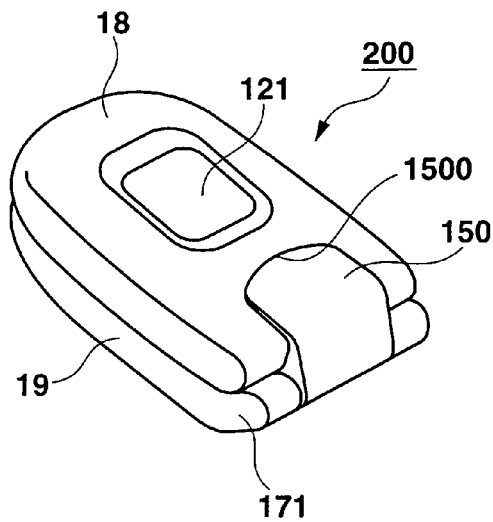
FIG. 7A is a perspective view showing a closed state of a cellular phone set 200 according to a third embodiment of the invention.
Figure 8D:
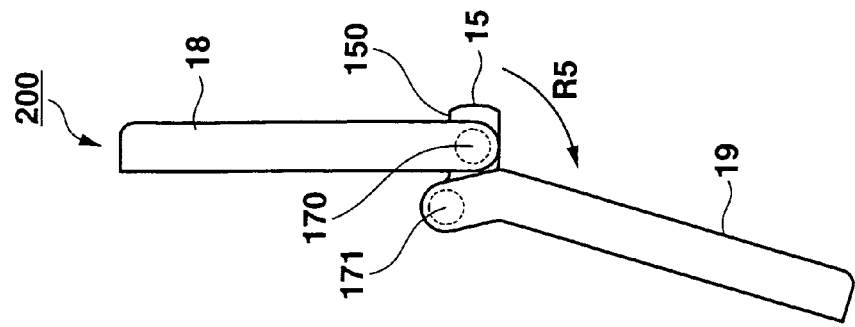
FIG. 8D is a side view showing a state in which the camera 15 is oriented to the side of the display device 121.
Figure 8C:
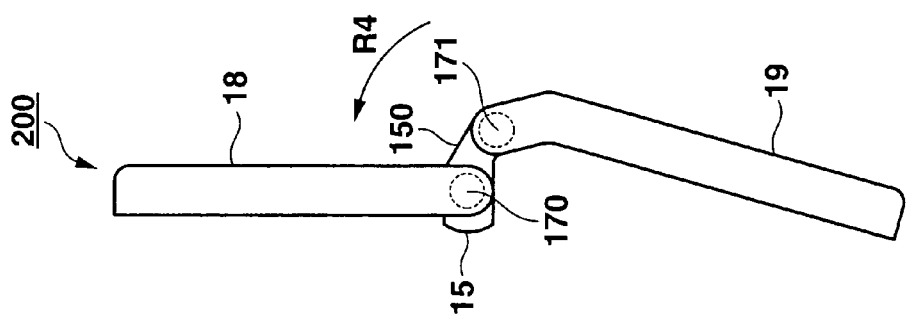
FIG. 8C is a side view showing a state in which the camera 15 is oriented to the side of the display device 120 in the opened state of the cellular phone set 200.
Figure 8B:
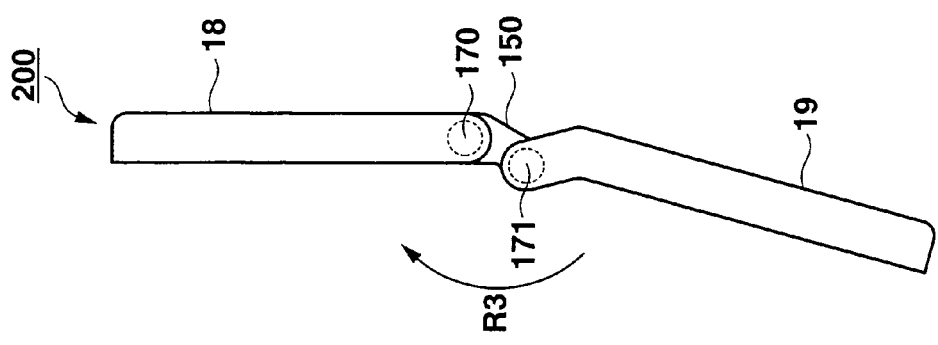
FIG. 8B is a side view showing an opened state of the cellular phone set 200.
Figure 8A:
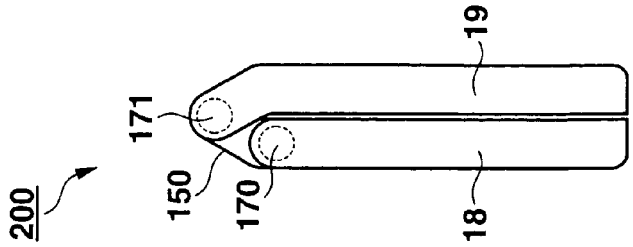
FIG. 8A is a side view showing a closed state of the cellular phone set 200 according to the third embodiment.

Therefore, as shown in FIGS. 7A and 8A, in a closed state in which the second case 19 and the first case 18 are superimposed on each other, the upper half section 1500 of the camera 150 and the camera 15 and LED 150 on its distal end face are stored in the cutout section 1800 of the first case 18, so that the camera 15 and LED 150 can be protected.

Figure 7B:
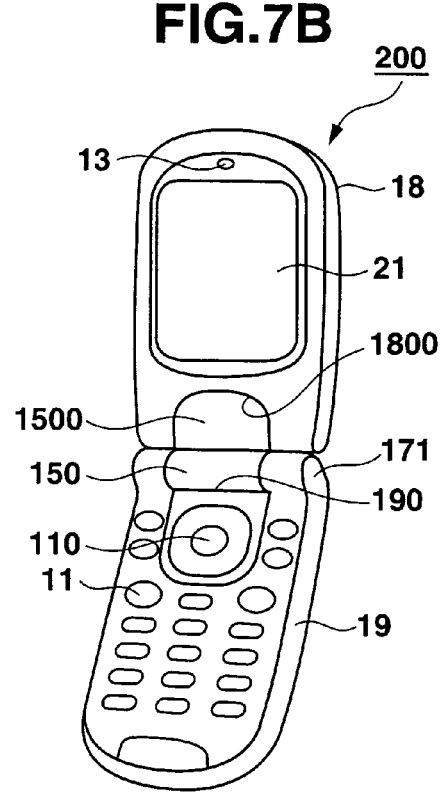
FIG. 7B is a perspective view showing an opened state of the cellular phone set.

The first case 18 is then turned in R3 direction around the second hinge 171 together with the camera unit 150 from the closed state, and opened relevant to the second case 19. As shown in FIGS. 7B and 8B, the first case 18 and the camera unit 150 are positioned on an extension of the second case 19.

Figure 7C:
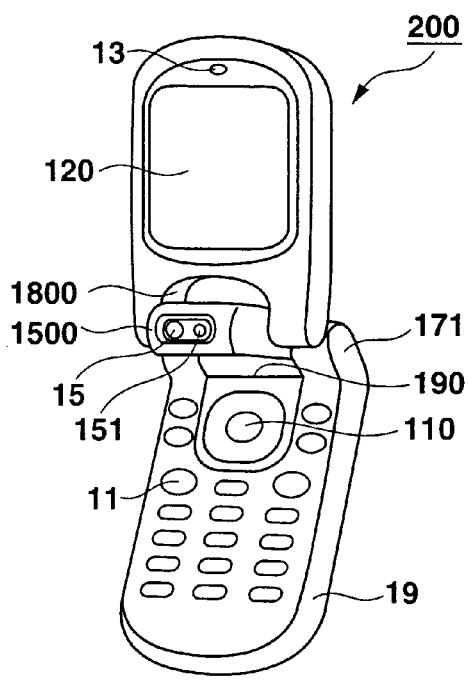
FIG. 7C is a perspective view showing a state in which a camera 15 is oriented to the side of a display device 120 in the opened state of the cellular phone set.

Next, the first case 18 is turned in R3 direction around the first hinge 170 of the camera unit 150 so as to be pulled back toward the user, and the camera unit 150 is turned in R4 direction around the second hinge 171 relevant to the second case 19. Consequently, as shown in FIGS. 7C and 8C, the first case 18 is positioned in front of the user on the extension of the second case 19, and at the same time, the upper half section 1500 of the camera unit 150 is oriented to the user.

In this manner, the main display device 120, the camera 15, and the LED 151 are oriented to the user, and the opened and closed state detector 25 detects a moving image capture mode, and starts capture of a moving image.

Figure 7D:
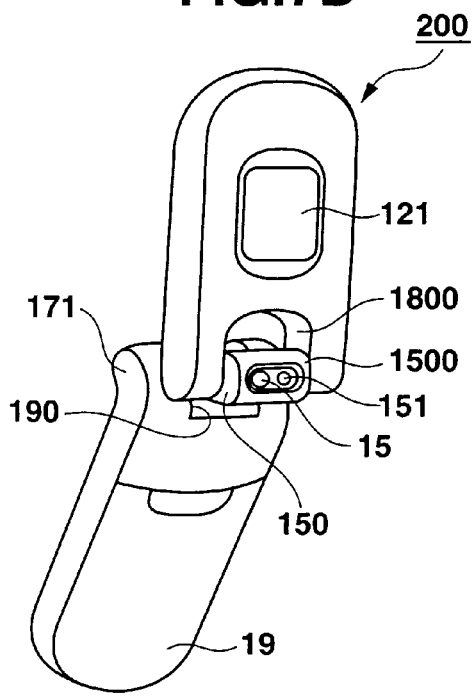
FIG. 7D is a perspective view showing a state in which the camera 15 is oriented to the side of a display device 121.

On the other hand, the camera unit 150 is turned in R5 direction around the first hinge 170 so as to space the first case 18 away from the second case 19. As shown in FIGS. 7D and 8D, the first case 18 and the camera unit 150 are positioned at a back face side of a face having the operating device 11 so as to roll over the second case 19. In this way, the camera 15 and the LED 151 provided at the upper half section 1500 of the camera unit 150 are oriented to the same direction as the subsidiary display device 121.

In this manner, the opened and closed state detector 25 carries out detection again, temporarily terminates moving image capture, stores it in a file, and then, restarts moving image capture while the top and bottom of the image are reversed.

According to the cellular phone set 200 of the third embodiment, a two-axis structure comprising the first hinge 170 and the second hinge 171 is thus provided, thereby making it possible to detect the start and end of moving image capture even if the camera 15 is oriented to any direction. Thus, by starting up an edit mode after moving image capture, processing operation is automatically carried out even if the user does not carry out special processing operations such as fade-in and fade-out processing operations.

Fourth Embodiment

A cellular phone set 300 according to a fourth embodiment of the invention will now be described here.

In the portable cellular phone 300 according to the fourth embodiment, as shown in FIGS. 9A to 9C, 10A and 10B, the first case 18 is superimposed along a longitudinal direction of the second case 19. Then, the second case 19 and the first case 18 are turnably assembled each other via a camera unit 150 at one end side in the longitudinal direction of that superimposed state.

The first case 18 is size of covering the second case 19. The first case comprises the main display device 120 on a face side thereof superimposed on the second case 19 and comprises the subsidiary display device 121 on a back face side thereof, as shown in FIG. 9B.

Figure 10A:
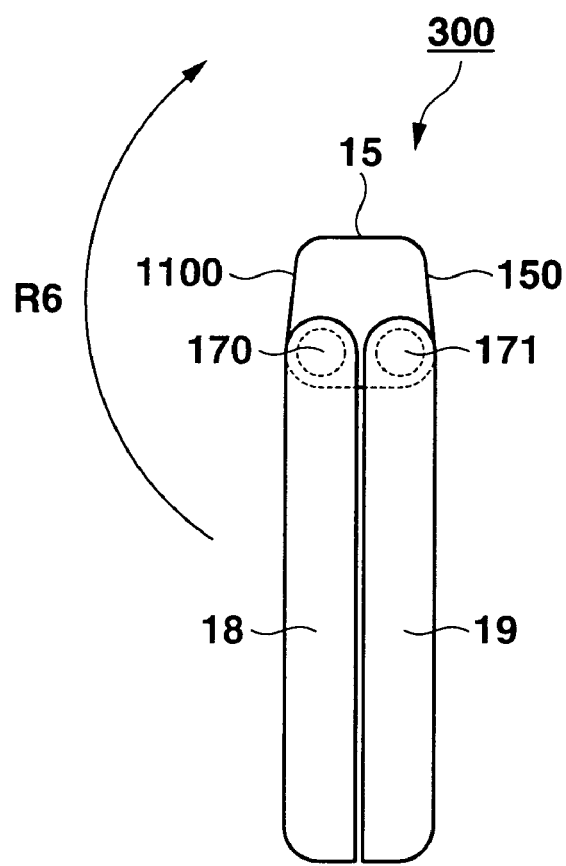
FIG. 10A is a side view showing a closed state of the cellular phone set 300 according to the fourth embodiment.

As shown in FIG. 10A, one end of the camera unit 150 is turnably coupled with an end of the first case 18 in R6 direction by means of a first hinge 170, and is turnably coupled with an end of the second case 19 in R6 direction by means of a second hinge 171.

The camera unit 150 comprises the camera 15 at a distal end face opposite to the first hinge 170 and the second hinge 171 as shown in FIG. 9B. Then, a shutter button 1100 for instructing still image capture during moving image capture is provided on a top face of the camera unit 150.

Figure 10B:
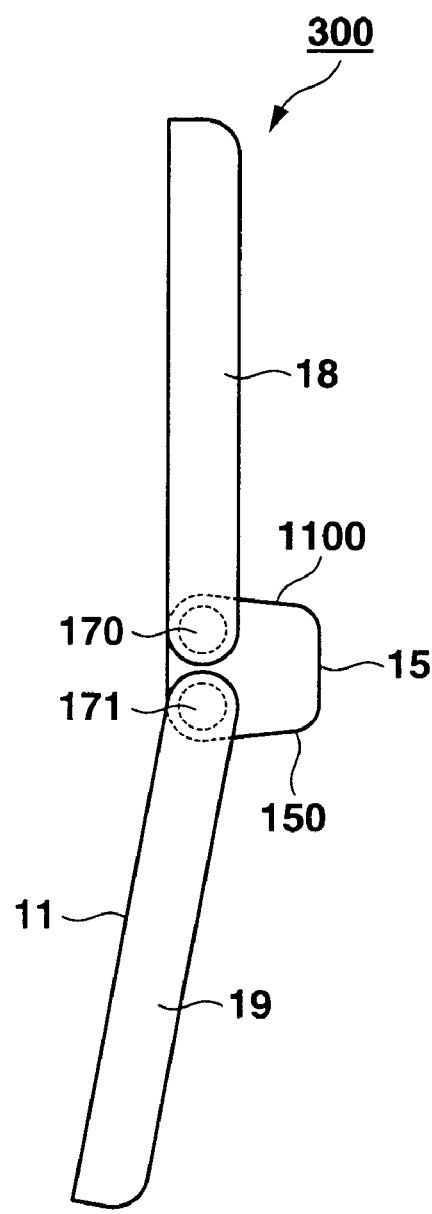
FIG. 10B is a side view showing an opened state of the cellular phone set 300.

With the above-described appearance, the user of the cellular phone set 300 turns the second case 19 and the first case 18 upwardly and downwardly by the first hinge 170 and the second hinge 171 relevant to the camera unit 150 from the closed state in which the second case 19 and the first case 18 shown in FIGS. 9A and 10A are superimposed on each other, and opens the second case 19 and the first case 18 as shown in FIGS. 9B and 10B, thereby making it possible for the opened and closed state detector 25 to detect the opening and start moving image capture. During the moving image capture, the user places the camera unit 150 protruding forwardly from the second case 19 and the first case 18 on a middle finger of one hand and apply a thumb to the on camera unit from the rear side, as shown in FIG. 9C. The user carries out capture while looking the main display device 120 as a finder (monitor).

As described above, according to the cellular phone set 300 of the fourth embodiment, moving image capture can be started in a state in which the user can easily hold the cellular phone set. In addition, even while in moving image capture, an operation of the shutter button 1100 is detected, thereby making it possible to store a frame image captured at that time as a still image.

Fifth Embodiment

A cellular phone set 400 according to a fifth embodiment of the invention will be described with reference to FIGS. 11A, 11B, and 12A to 12C.

Figure 11A:
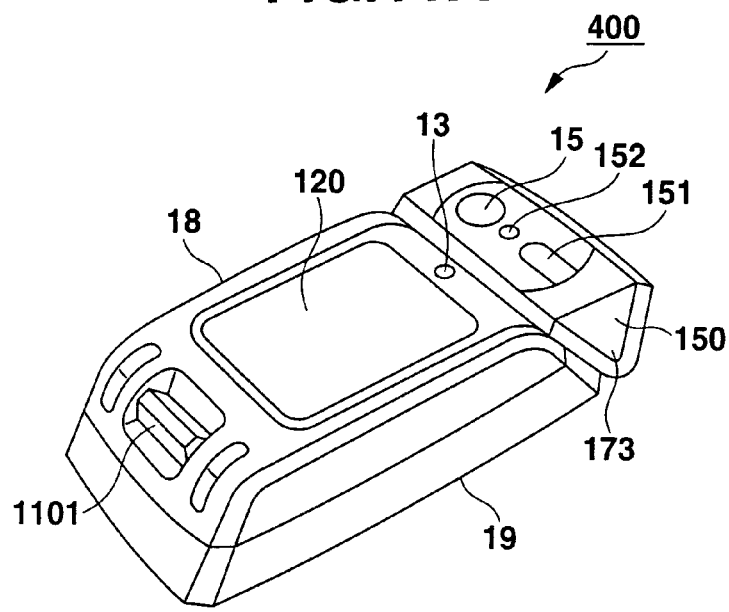
FIG. 11A is a perspective view showing a state in which an operating device 11 of a cellular phone set 400 according to a fifth embodiment of the invention.
Figure 11B:
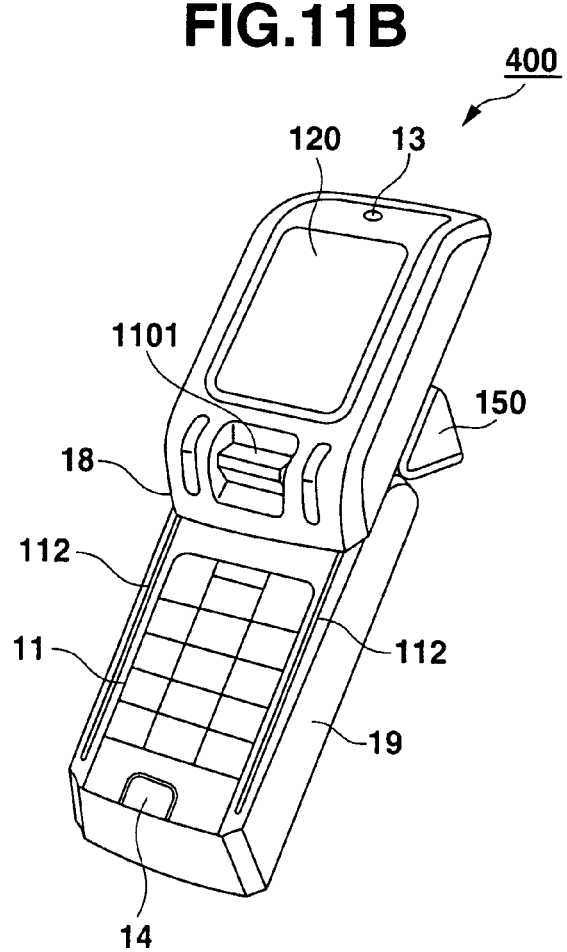
FIG. 11B is a perspective view showing a state in which a first case 18 has been slid.

As shown in FIG. 11B, the cellular phone set 400 according to the fifth embodiment comprises the operating device 11 at one face side (a top face shown in the figure) thereof. As shown FIGS. 11A and 12A, the first case 18 is superimposed along a longitudinal direction on a face having the operating device 11 of the second case 19.

The first case 18 is of size covering the second case 19. As shown in FIGS. 11A and 11B, the first case comprises the main display device 120 and an operating device 1101 on a surface (a top face shown in the figures) thereof in a state in which the first case is positioned on the second case 19.

Figure 12A:
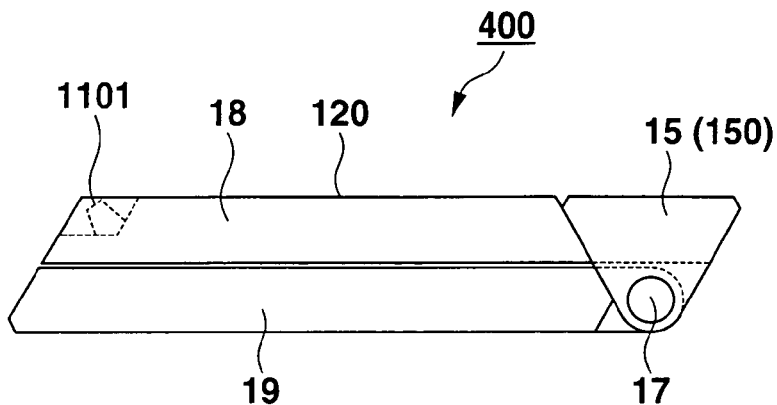
FIG. 12A is a side view showing a state in which the operating device 11 of the portable cellular phone 400 according to the fifth embodiment has been housed.
Figure 12B:
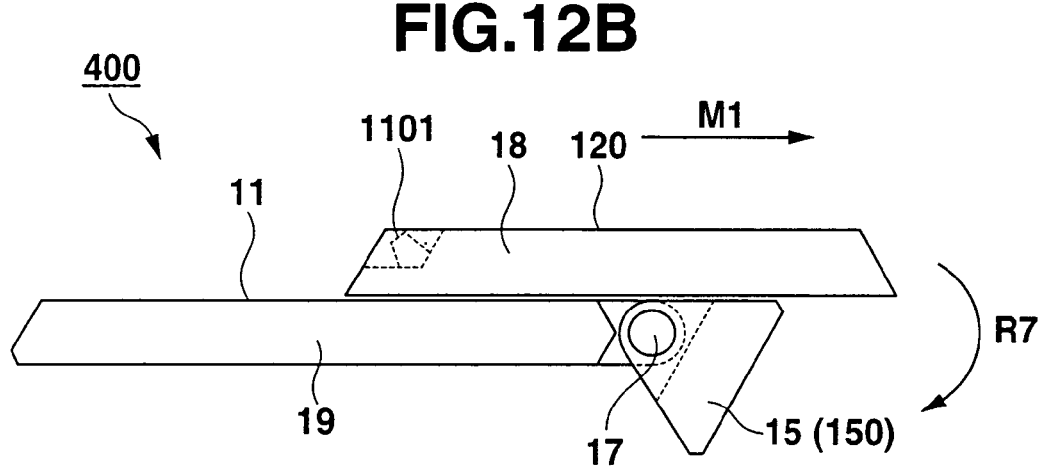
FIG. 12B is a side view showing a state in which the first case 18 is being slid.
Figure 12C:
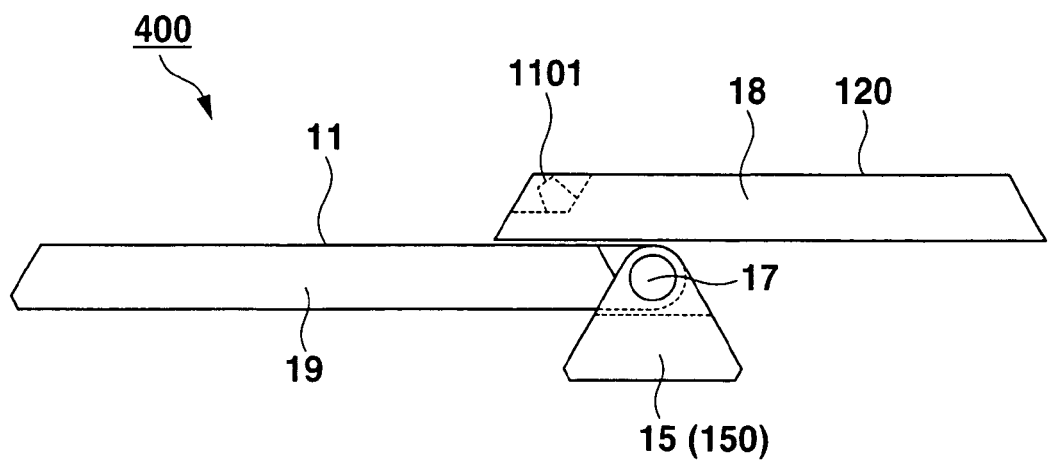
FIG. 12C is a side view showing a state in which the first case 18 has been slid.

A camera unit 150 is formed in a substantially triangular shape seen from a side face view. As shown in FIG. 11A, the camera 15 and the LED 151 and the sound collecting microphone 152 are provided on a surface of the camera unit in a line. An end of the camera unit 150 opposite to the camera 15 is turnably coupled with one end in a longitudinal direction of the second case 19 by means of a first hinge 170, as shown in FIGS. 12A and 12B, In the foregoing description, in the second case 19 and the first case 18, there is provided a slide mechanism 112 for slidably assembling the first case 18 superimposed on a face having the operating device 11 with the second case 19 in a longitudinal direction. A guide groove 112 is provided to slide the first case 18 along both sides of the operating device 11 of the second case 19. A slide pin (not shown) is installed to be engaged with the guide groove 112.

With such a configuration, in the fifth embodiment, the first case 18 superimposed on the second case 19 is slid to be parallel to M1 direction as shown in FIG. 12B, whereby the camera unit 150 provided at an end of the second case 19 is engaged with the first case 18 operated to be slit, the camera unit is rotated in R7 direction, and the opened and closed state detector 25 detects this rotation. In addition, this detection makes it possible to start moving image capture and start sound recording at the same time.

As described above, according to the cellular phone set 400 of the fifth embodiment, moving image capture can be started in a state in which the user can easily hold the cellular phone set. In addition, the sound collecting microphone 152 is embodied, thereby making it possible to suitably record a sound on an object.

Sixth Embodiment

A cellular phone set 500 according to a sixth embodiment of the invention will be described with reference to FIGS. 13A to 13C.

Figure 13A:
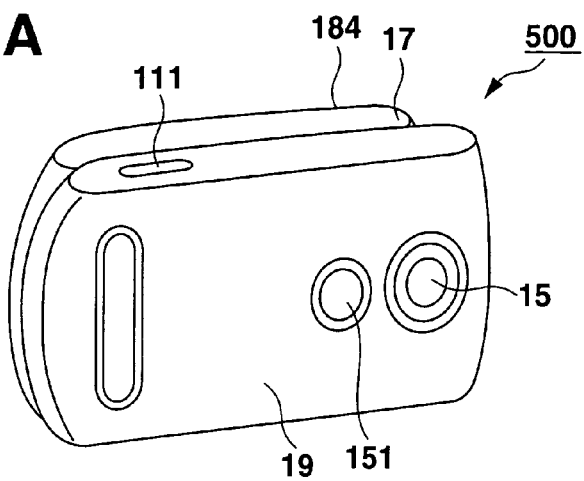
FIG. 13A is a perspective view showing a state in which an operating device 11 of a cellular phone set 500 according to a sixth embodiment of the invention has been housed.
Figure 13B:
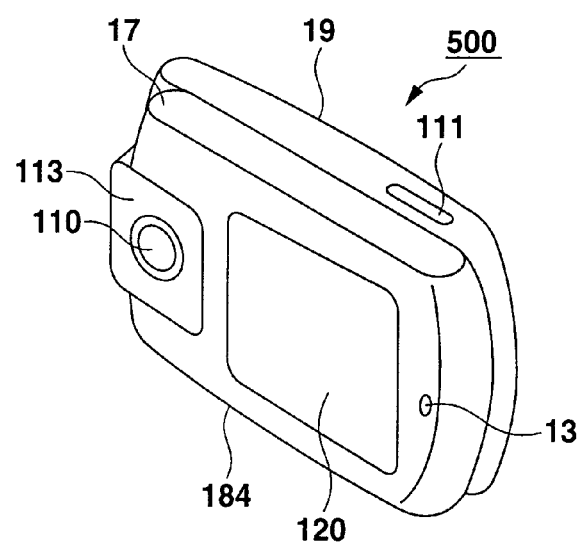
FIG. 13B is a perspective view showing a state in which a first case 184 has been rotated and closed by operating a hinge 17 around a rotary shaft and rotating it at a rotary section 112.
Figure 13C:
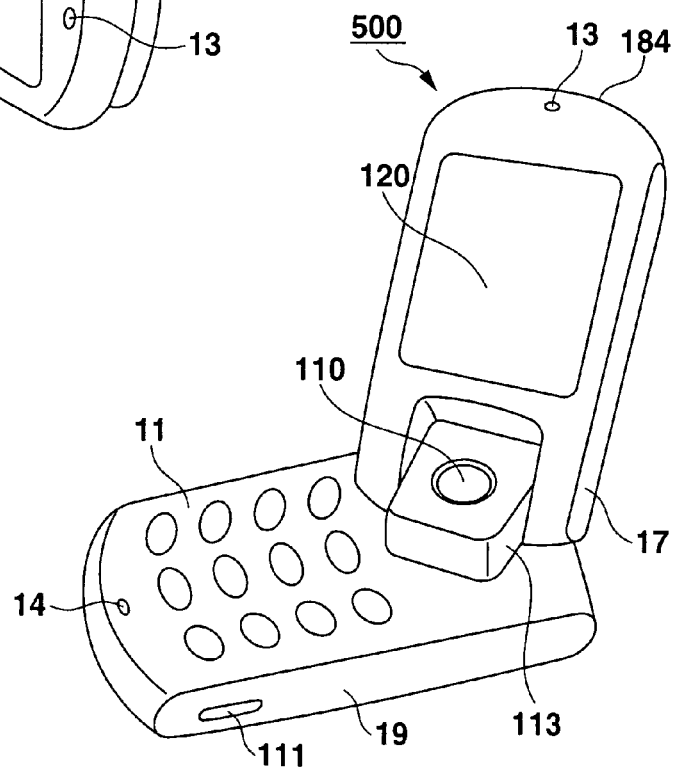
FIG. 13C is a perspective view showing a state in which the first case 184 has been opened from the state shown in FIG. 13B, and has been rotated via the rotary shaft 112.

In the cellular phone set 500 according to the sixth embodiment, the first case 18 is superimposed along a longitudinal direction of a face having the operating device 11 of the second case 19 as shown in FIGS. 13A to 13C. The second case 19 and first case 18 are turnably assembled with each other via a rotary section 113 and the hinge 17 on one end side thereof in a longitudinal direction of that superimposed state.

The first case 18 is of size covering the second case 19, and comprises the main display device 120 on one face side thereof, as shown in FIGS. 13B and 13C.

In addition, on an opposite side face of the face having the operating device 11 of the second case 19, the camera 15 and the LED (light emitting member) 151 are arranged in a line as shown in FIG. 13A. The camera 15 and LED 151 are positioned at a back side spaced on one side of the operating device 11. Further, a side switch 111 is provided on one side face of the second case 19. The side switch 111 is positioned at the other side relevant to the camera 15 and the LED 151.

The rotary section 113 is rotatably assembled with the second case 19 at a lateral position of the operating device 11 around an axis which is identical to an optical axis of the camera 15. An operating device 110 having a touch sensor function is provided at a center of the rotary section 113, and the first case 18 is turnably coupled with one end in a longitudinal direction by means of the hinge 17 in which a line formed at a right angle relevant to its rotary axis is defined as a center.

From the foregoing description, the first case 18 can be arbitrarily swiveled with respect to the second case 19 in a 360-degree direction including a direction along the face the operating device 11 around the center of its rotation via the rotary section 113. Further, the first case 18 is turnable with respect to the rotary section 113 in a 180-degree direction around the hinge 17.

In such a configuration, in the sixth embodiment, if a closed state is established such that an opposite face to a face having the main display device 120 of the first case 18 is superimposed on a face side having the operating device 11 of the second case 19 as shown in FIGS. 13A and 13B, a state is established such that the camera 15 of the second case 19 is oriented to the opposite side to the user and the main display device 120 of the first case 18 is oriented toward the user. That is, a use state is established such that the user holds a digital camera with one hand, and there is established a state suitable to landscape capture or use of image capture of another person by the camera 15 while looking the main display device 120 as a finder (monitor).

From this state, the second case 19 is turned by 18 degrees around the hinge 17, the main display device 120 is oriented to the side which is identical to the camera 15, and the main display device 120 and the camera 15 are oriented to the user holding the camera with one hand, whereby a state suitable to use of image capture of the user oneself. In addition, a state suitable to use of a television cellular phone can be established.

In the case where any mode is taken, the opened and closed state detector 25 detects such any mode. In this case, for example, if the state shown in FIG. 13A is changed to that shown in FIG. 13B once, moving image capture is started. When moving image capture is terminated by changing the state shown in FIG. 13B to that shown in FIG. 13C, an operation such as E-mail transmission can be carried out immediately.

Seventh Embodiment

Now, a description will be given with respect to a further detailed operation of the cellular phone sets 1, 100, 200, 300, 400, and 500 as a seventh embodiment of the invention with reference to FIGS. 14 to 16. Although the following description will be given by way of the cellular phone set 1, the cellular phone sets 100, 200, 300, 400, and 500 according to the above-described second and subsequent embodiments can be operated in the same manner.

Figure 14:
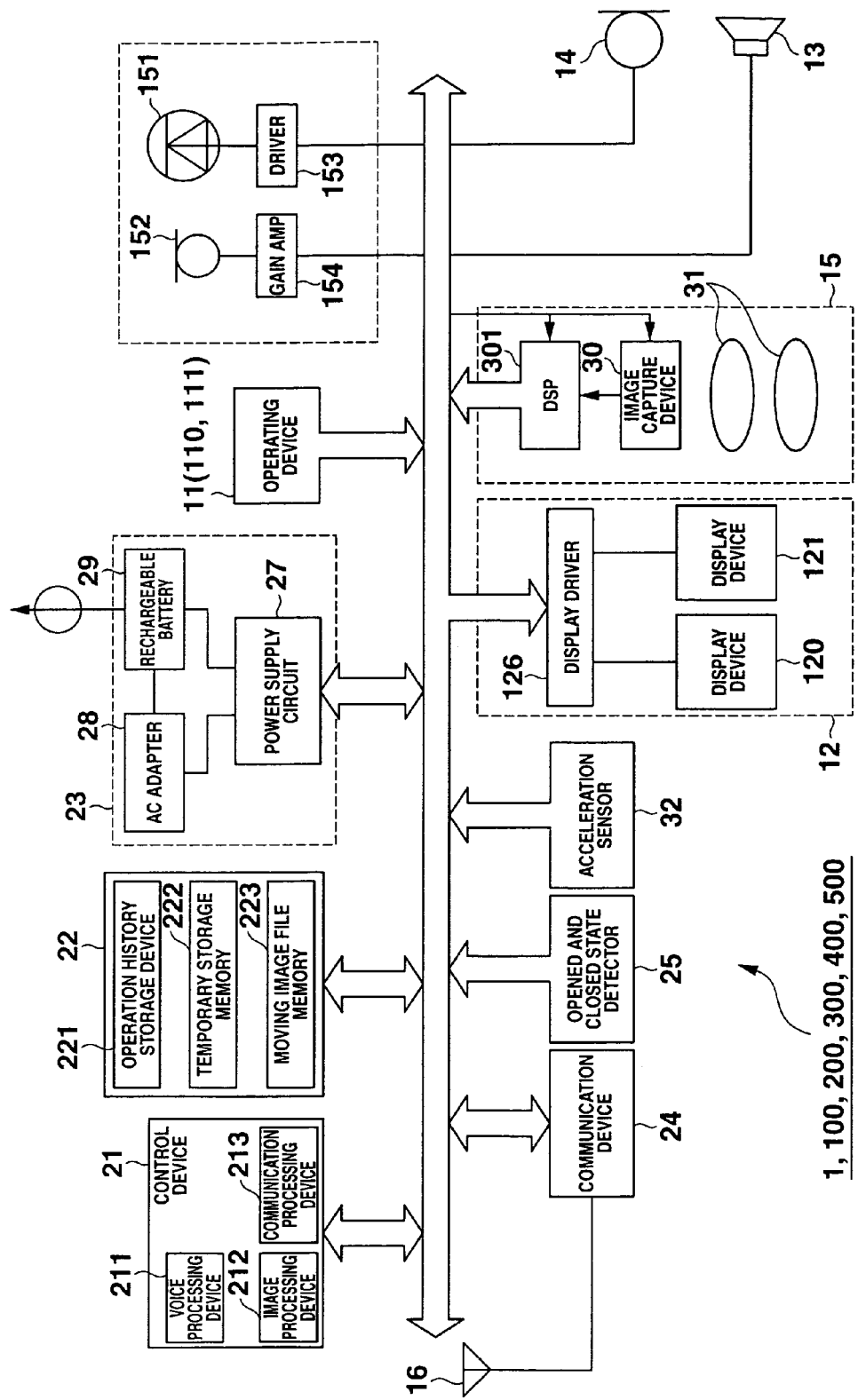
FIG. 14 is a block diagram depicting an internal configuration of each of the cellular phone sets 1, 100, 200, 300, 400, 500 in a seventh embodiment of the invention.

FIG. 14 is a circuit block diagram depicting the cellular phone set 1 in the present embodiment. In the figure, the cellular phone set 1 includes the control device 21 which comprises a sound processing device 211, an image processing device 212, and a communication processing device 213; the storage device 22 which comprises an operation history storage device 221, a temporary storage memory 222, and a moving image file memory 223; the power supply section 23; the communication device 24; the opened and closed state detector 25; the display driver 26; the power supply circuit 27; the operating device 11; the speaker 13; the microphone 14; the acceleration sensor 32; a gain amplifier 154; and the camera 15.

The control device 21 incorporates a plurality of processing chips when a central processing unit (CPU) (not shown) is used as a core.

The sound processing device 211 compresses and encodes in ACC scheme data a sound or a talk sound during moving image capture, the sound or talk sound being output after A/D converted from the sound collecting microphone 152 and the microphone 14. The sound acquired from the sound collecting microphone 152 is stored in a sound file at the same time as when a moving image is compressed and encoded as described later. In addition, the talk sound acquired from the microphone 14 is compressed and encoded to data which conform to a QCELP format, and the compressed and encoded data is output to the communication processing device 213. Moreover, the sound processing device 211 filters a signal oriented to one's own device at the communication device 24 from a radio signal which conforms to a CDMA scheme, the radio signal being received from the antenna 16 under the control of the communication processing device 213. Then, this sound processing device carries out a decoding operation from the compressed and encoded data obtained during that filtering to a sound signal.

In the image processing device 212, during moving image capture, a moving picture image is formed and read out at the image capture device 30 every predetermined time intervals (for example, 15 Frames Per Second (FPS)). The image data sampled or digitized at a DSP 301 is converted into RGB data during a through image display, and the converted RGB data is sent out to the display driver 126. When moving image capture is started based on a control signal from the Opened or closed state detector 25 or operation and detection of the center key 110, the image data sampled or digitized at the DSP 301 is converted into a brightness color different signal of a YUV (422) while the through image is displayed. Then, a moving image file conforming to an MPEG format is generated in a real time.

When the end of moving image capture is detected based on the control signal from the opened and closed state detector 25 or the operation and detection of the center key 110, the moving image file generated in a real time is temporarily closed, and the closed file is stored in the temporary storage memory 222. Then, based on the storage contents of the operation history storage device 221, the contents being acquired after image capture has been completed, a start frame to a predetermined frame or a predetermined frame to a final frame are sampled. Then, the fade-in and fade-out processing operations are carried out, and a re-compressing and re-encoding operation is also carried out.

The communication processing device 213 controls the control device 24 so as to acquire a signal oriented to one's own device from a radio signal which conforms to the CDMA scheme in accordance with an identification code obtained from a communication service company which a user has prescribed. Further, in the case where data targeted for radio communication is packet data, this communication processing device controls a communication timing of that packet data.

The camera 15 comprises the lens 31, the image capture device 30, and the DSP 301 having a RAM.

The storage device 22 stores programs associated with system or operation of the cellular phone set 1 such as an operating system (OS) or a variety of operating programs and a variety of data such as a moving image or a sound. In addition, this storage device 22 comprises the temporary storage memory 222 and the moving image file memory 223.

The operation history storage device 221 stores a time from input detection of a control signal from the Opened or closed state detector 25 to the end of opening and closing operations caused by sensing of the acceleration sensor 32; and an opening and closing speed or timing input by the acceleration sensor 32, during moving image capture operation as described later.

The temporary storage memory 222 is provided to temporarily store a moving image file compressed and encoded in a real time at the image processing device 212, the moving image file being closed by detection of the end of the image capture.

Now, a fade-in processing operation in the portable cellular phone 1 will be described with reference to a flow chart shown in FIG. 15. The processing operation described here includes step S31 to step S56 to be carried out by the cellular phone set 1.

The cellular phone set 1 in its closed state senses depressing of the side switch 111 and goes to a moving image capture mode. First, at step S31, an image reading procedure starts in which the images formed at the image capture device 30 are read out on a one by one frame base every predetermined interval (for example, 15 FPS). In step S32, the read-out images are converted into the RGB format, and at step S33, the converted images are sent out and expanded at the display driver.

The expanded images are subjected to update processing operation with predetermined intervals, and are updated images are displayed at the subsidiary display device 121. At step S35, it is determined whether or not the first case 18 is operated to be opened from the second case 19 around the hinge 17 in accordance with whether or not a control signal is input from the opened or closed state detector 25. It is to be noted that step S35 is not necessary to be performed after step S34. It is possible to perform step S35 at any timing from S31 to S34.

The operations from step S31 to step S34 are repeated until the control signal has been input from the opened and closed state detector 25. When the control signal is input from the opened and closed state detector 25, the control device 21 starts counting from a timing at which the control signal has been input, and acquires information from the acceleration sensor 32 at that time point, at step S36. Then, the control device 21 starts to record into the operation history storage device 221 a time from the above information capture time to a time for the first case 18 to be completely opened from the second case 19 (for example, turning at 160 degrees or more, for example, is carried out while the hinge 17 is defined as a turning axis) and an acceleration change. Then, at step S37, the above operations are continued until the completely opened state has been sensed.

When the completely opened state has been determined at step S37, recording into the operation history storage device 221 is terminated at step S38, and the image displayed at the subsidiary display device 121 is displayed on the main display device 120. Next, at step S39, the images formed at the image capture device 30 are read out on a one by one frame basis every predetermined interval (for example, 15 FPS). These frame images are converted into RGB format images for display and output at the image processing device 212, and at the same time, these frame images are also converted into YUV format images.

The frame images converted into the YUV format at step S39 are compressed and encoded in a real time at step S40. The encoded image data are stored in the temporary storage memory 222 as a file at step S41. Then, the continuation of the image capture (the operations of step S39 and S40) at step S43 is carried out until operation of the center key 110 has been detected at step S42, namely, until the end of the image capture has been sensed.

When the operation of the center key 110 is detected at step S42, the end of the image capture is determined. Then, the processing of the image capture device 30 is temporarily stopped, and the moving image file stored in the temporary storage memory 222 is subjected to a close processing at step S44. This close processing denotes, in more detail, a processing for producing a file header and attaching the produced header to a moving image file, or a processing for writing profile data (date and time of image capture, image capture time (start time or end time), image capture place, file capacity or person who has undergone image capture).

When the close processing has terminated, the operation history storage device 221 reads out a time from the start of turning to the end of turning between the first case 18 and the second case 19 via the hinge 17 and an acceleration change at step S45. Then, at step S46, the moving image file stored in the temporary storage memory 222 is expanded. In step S47, a fade-in processing operation is carried out from a start frame to a predetermined frame of the moving image file based on the above-described time from the start to the end of turning and acceleration change.

This processing operation specifically denotes a processing for providing a difference in the number of frames to which the processing operation is applied, in accordance with cases in which a time from the start to the end of turning is comparatively long and short, wherein more frames are subjected to the processing operation when the time is long. In addition, with respect to the acceleration change, as a speed change per a unit time increases, the processing operation is made so as to increase its degree.

When the processing operation has completed, it is determined whether or not a reproduction instruction is detected at step S48 with respect to the processed moving image file. In the case where the reproduction instruction has been detected, the processed moving image file is reproduced at step S49. In the case where the reproduction instruction has not been detected, the presence or absence of an instruction for storing the processed moving image file is determined at step S50. When the storage instruction is supplied, a compression and encoding operation is applied for the expanded and processed moving image file at step S51. Then, at step S52, the compressed and encoded moving image file is stored in the moving image file memory 223, and the processing is terminated.

On the other hand, in the case where the storage instruction is not supplied at step S50, the presence or absence of the storage instruction of an original moving image file which is not processed yet is determined at step S53. When the storage instruction is supplied, the processed moving image file is discarded at step S54. Then, the original moving image file is stored in the moving image file memory 223 at step S55, and the processing is terminated. In addition, in the case where the storage instruction has not been supplied at step S53, the original moving image file stored in the temporary storage memory 222 is also discarded (cleared) at step S56. At this time, the processed moving image file is also discarded, and the processing is terminated.

Now a fade-out processing operation in the cellular phone set 1 will be described with reference to a flow chart shown in FIG. 16. The processing operations described here includes step S61 to step S73 to be carried out by the cellular phone set 1.

Figure 15:
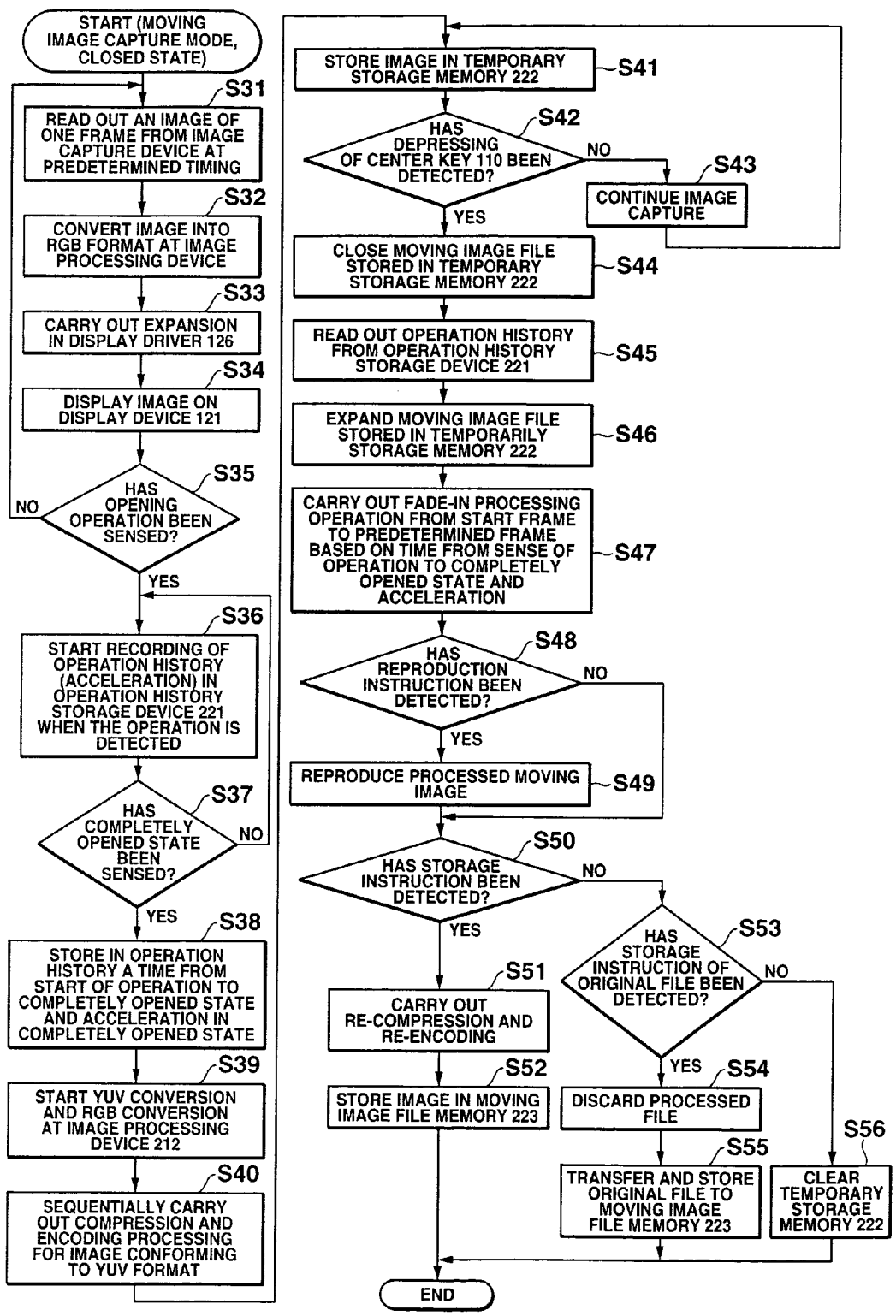
FIG. 15 is a flow chart illustrating a fade-in processing operation in the seventh embodiment.
Figure 16:
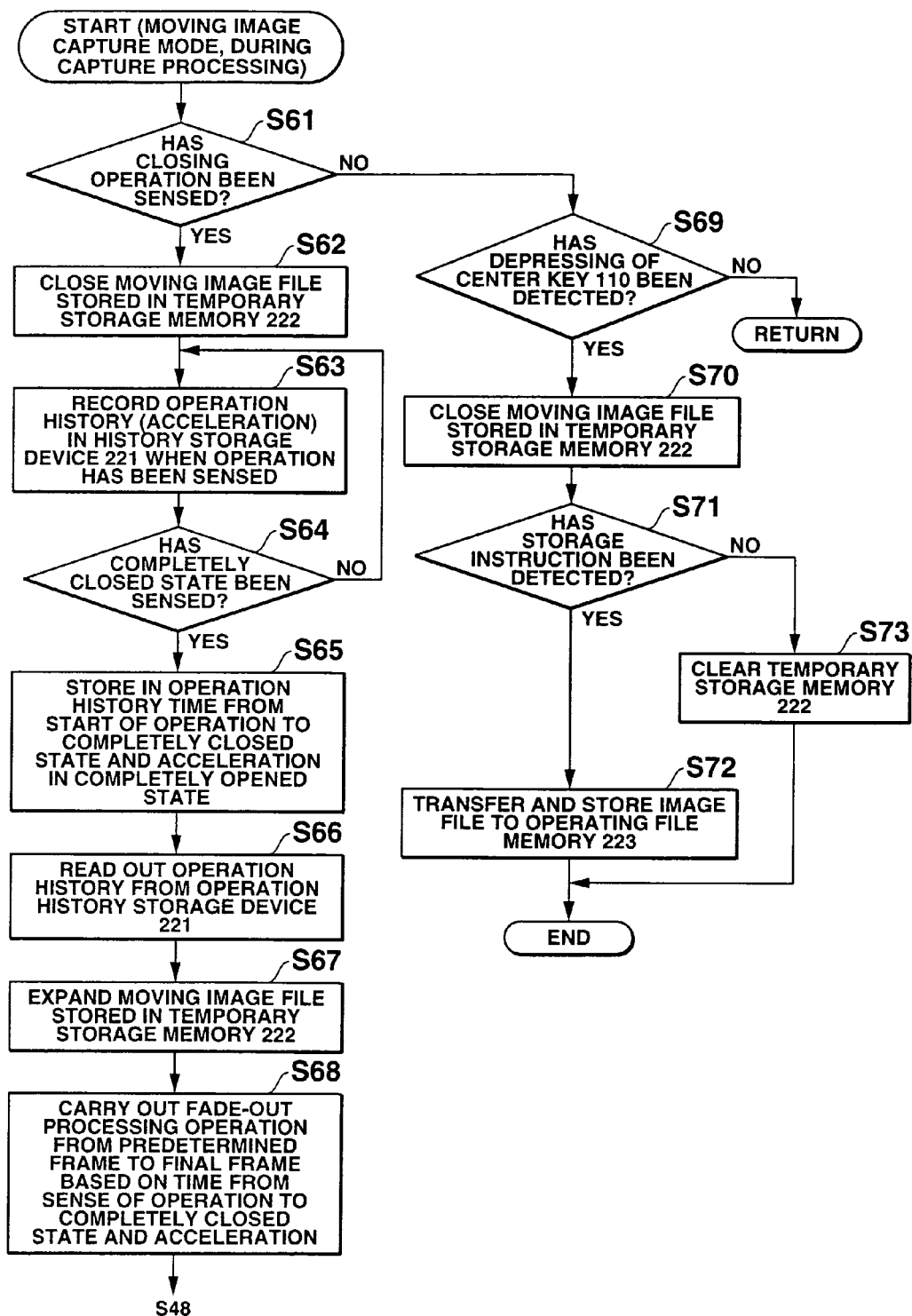
FIG. 16 is a flow chart illustrating a fade-out processing operation in the seventh embodiment.

With respect to this processing operation, a duration of moving image capture, i.e., a time at which the processing operations of step S39 to S41 in FIG. 15 is being carried out is defined as a start time point of this operation. Thereafter, the moving image capture processing is terminated in accordance with whether or not a control signal has been input from the Opened or closed state detector 25, i.e., whether or not it has been detected that the second case 18 is covered with the second case 19 (it has been detected that, when the hinge 17 is defined as a turning axis, an angle formed between the first case 18 and the second case is set to 0 degree), or alternatively, whether or not the operation of the center key 110 has been detected.

First, at step S61, it is determined whether or not the user has made a processing for closing the cellular phone set 1 in accordance with the presence or absence of input of the control signal from the Opened or closed state detector 25. In more detail, as described above, it is determined whether or not the operation for covering the first case 18 with the second case 19 has been detected, in accordance with the presence or absence of input of the control signal from the Opened or closed state detector 25.

In the case where the determination result is affirmative, the end of image capture is determined, and then, the processing of the image capture device 30 is temporarily stopped. Then, a close processing is carried out for the moving image files stored in the temporarily storage memory 222 at step S62.

This close processing denotes, in more detail, a processing for producing a file header and attaching the produced header to a moving image file, or a processing for writing profile data (date and time of image capture, image capture time (start time or end time), image capture place, file capacity or person who has undergone image capture).

Then, at step S63, the control device 21 starts counting from a timing at which the control signal has been input at step S62, and acquires information from the acceleration sensor 32 at that time point. The control device then starts to record into the operation history storage device 221 a time from the above information capture to a time at which the first case 18 is completely covered with the second case 19 (0 degree, for example, is set when the hinge 17 is defined as a turning axis), and an acceleration change. Then, at step S64, the above processing operation is continued until the completely covered state has been sensed at step S64.

When the completely covered state is determined at step S64, the recording into the operation history storage device 221 is terminated at step S65. Then, at step S66, the time from the start to the end of turning between the first case 18 and the second case 19 via the hinge 17 and the acceleration change are read out from this operation history storage device 221.

Then, at step S67, the moving image file stored in the temporary storage memory 222 is expanded. In step S68, a fade-out processing operation is carried out from a predetermined frame to the final frame of the moving image file based on the above-described time from the start to the end of turning and acceleration change, and the processing goes to step S48 shown in FIG. 15.

This processing operation specifically denotes a processing for providing a difference in the number of frames to which the processing operation is applied, in accordance with cases in which a time from the start to the end of turning is comparatively long and short, wherein more frames are subjected to the processing operation when the time is long. In addition, with respect to the acceleration change, as a speed change per a unit time increases, the processing operation is made so as to increase its degree.

On the other hand, if the operation of the center key 110 is detected without detecting the closing operation at step S61, the end of image capture is determined. Then, at step S70, the processing of the image capture device 30 is temporarily stopped. Then, a close processing is carried out for the moving image files stored in the temporary storage memory 222. The image capture processing operation is continued in the case where the control signal from the Opened or closed state detector 25 has not been input and in the case where the operation of the center key 110 has been detected.

With respect to the moving image file closed and stored in the temporary storage memory 222 at step S70, it is determined whether or not a storage instruction has been detected at step S71. When the storage instruction is detected, the moving image file is stored in the moving image file memory 223 at step S72, and the processing is terminated. In addition, in the case where the storage instruction has not been detected, the moving image file stored in the temporarily storage memory 222 is discarded at step S73, and the processing is terminated.

As has been described above, in the seventh embodiment, there are provided the opened and closed state detector 25 and the operation history storage device 221 for storing an information signal output from the acceleration sensor 32 until image capture has been terminated. Therefore, an operation relating to turning between the first case 18 and the second case 19 is stored. Thus, even when a plurality of moving image files are processed, it becomes possible to simply apply a processing operation, referring to the contents of the operation history storage device 221.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. A moving image capture apparatus comprising:
   an image pickup device;
   a moving image capture device which captures a moving image by driving the image pickup device;
   a first case;
   a second case;

a connecting portion which connects the first case and the second case to each other;

a first detection device which detects a change in positional relationship between the first case and the second case;

a capture control device which controls one of a start and an end of moving image capture by the moving image capture device in response to detection by the first detection device;

a measurement device which measures a time from a start to an end of the change in positional relationship between the first case and the second case; and an editing device which edits, based on the time measured by the measurement device, the moving image acquired in accordance with the control by the capture control device.

2. A moving image capture apparatus according to claim 1, wherein the editing device edits the moving image from a start frame to a predetermined frame of the moving image.

3. A moving image capture apparatus according to claim 1, wherein the editing device edits the moving image from a predetermined frame to a final frame of the moving image.

4. A moving image capture apparatus according to claim 1, further comprising a second detection device which detects a degree of a position change per unit time from the start to the end of the change in positional relationship between the first case and the second case, wherein the editing device edits the moving image based on the degree detected by the second detection device.

5. A moving image capture apparatus according to claim 1, further comprising:

an instruction device which instructs an end of the moving image capture by the moving image capture device; and a control device which controls the editing device in accordance with whether the end of the moving image capture is instructed by the instruction device , or in response to the detection by the first detection device.

6. A moving image capture apparatus according to claim 1, further comprising:

a first display device;

a second display device;

a first display control device which causes the second display device to display an image produced by driving the image pickup device; and a second display control device which causes the first display device to display an image produced by driving the image pickup device in response to detection of a change in positional relationship between the first case and the second case by the first detection device.

7. A moving image capture apparatus according to claim 1, further comprising:

a first storage device which stores the moving image acquired in accordance with the control by the capture control device; and a second storage device which stores the moving image edited by the editing device.

8. A moving image capture apparatus according to claim 1, wherein the first case is connected to a third case which comprises the image pickup device, and the second case is connected to the third case via the connecting portion.

9. A moving image capture apparatus according to claim 1, further comprising a camera unit which comprises the image pickup device, wherein the connecting portion comprises a first connecting portion which connects the camera unit and the first case to each other and a second connecting portion which connects the camera unit and the second case to each other, and wherein the first detection device detects a change in positional relationship between the first case and the second case around at least one of the first connecting portion and the second connecting portion.

10. A moving image capture control method of a moving image capture apparatus including a first case, a second case, and a connecting portion which connects the first case and the second case to each other, the method comprising:

performing moving image capture to acquire a moving image by driving an image capture section;

detecting a change in positional relationship between the first case and the second case;

controlling one of a start and an end of the moving image capture in response to detection of the change in positional relationship;

measuring a time from a start to an end of the change in positional relationship between the first case and the second case; and editing the acquired moving image based on the measured time from the start to the end of the change in positional relationship.

* * * * *